United States Patent Office 3,066,528
Patented Dec. 4, 1962

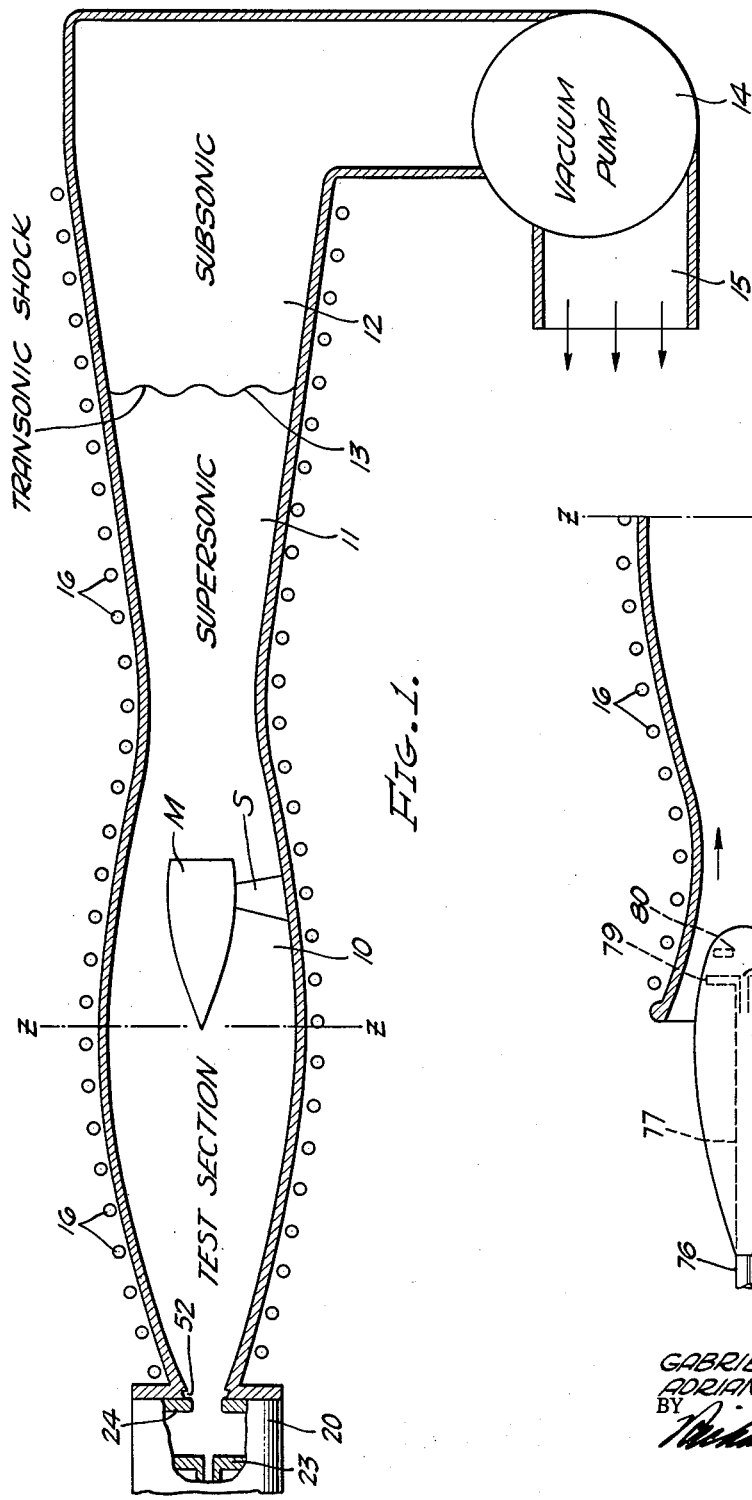

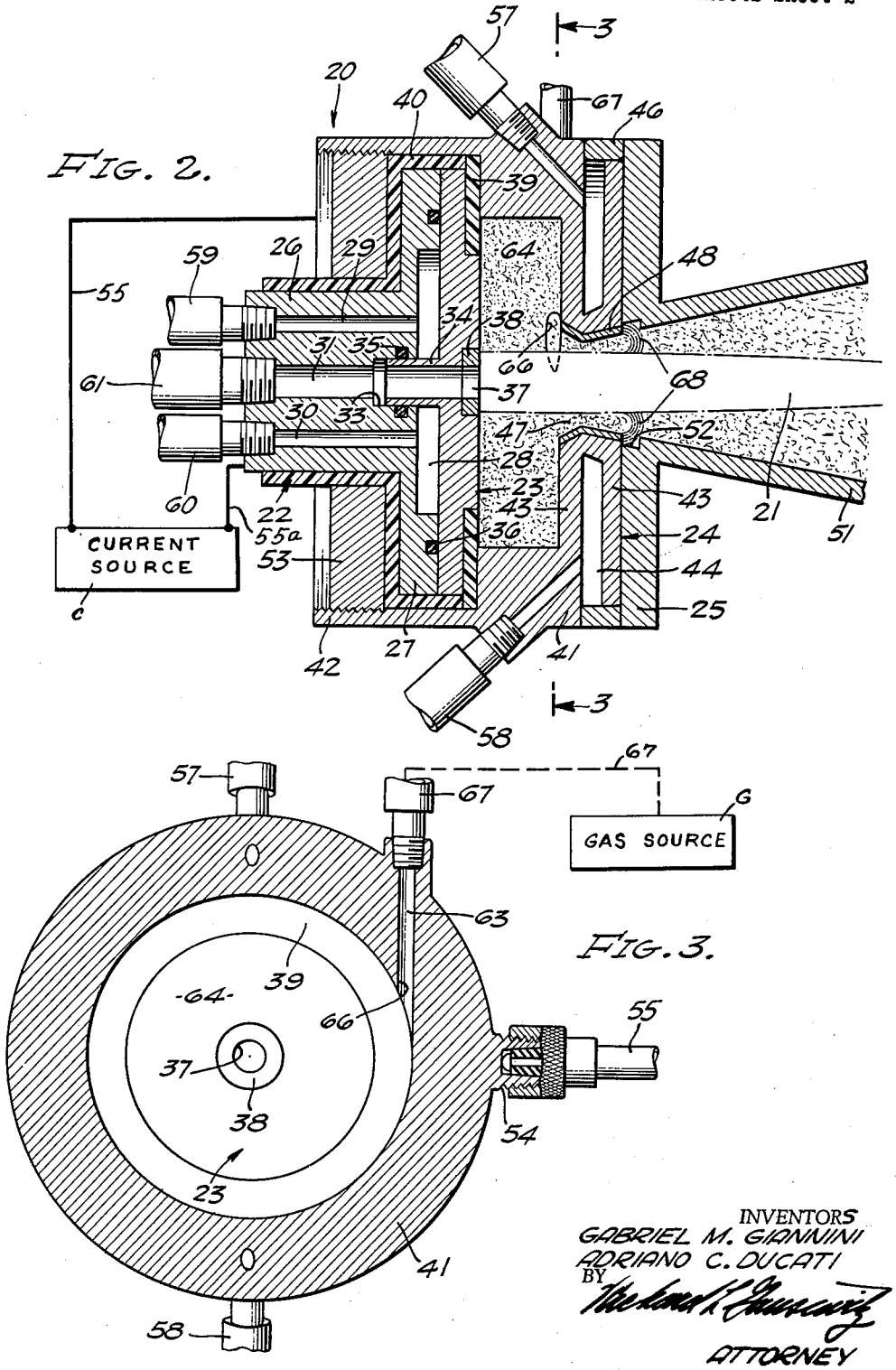

3,066,528
WIND TUNNEL
Gabriel M. Giannini, Newport Beach, and Adriano C. Ducati, Corona del Mar, Calif., assignors to Plasmadyne Corporation, a corporation of California
Filed Dec. 9, 1957, Ser. No. 701,406
13 Claims. (Cl. 73—147)

This invention relates to gas-acceleration and pump means, and more particularly to an improved wind tunnel adapted to effect both heating and acceleration of gas. The present application is a continuation-in-part of our co-pending application Serial No. 649,461, filed March 29, 1957, for Plasma Stream Apparatus and Methods, now abandoned.

An important problem in conventional wind tunnels and similar apparatus is that of accelerating the gas, and obtaining high Mach numbers, without creating excessively low temperatures. In conventional wind tunnels, gas acceleration is produced solely by the expansion (normally into a vacuum chamber) of a highly compressed gas. Heating means have been employed to prevent an excessive reduction in temperature, but such heating means did not normally aid in the gas-acceleration operation. Furthermore, such tunnels were characterized by lack of concentricity, inability to achieve high Mach numbers, and other defects which limited their usefulness and reliability.

In view of the above and other factors characteristic of the field of wind tunnels and the like, it is an object of the present invention to provide an improved wind tunnel for effecting acceleration of gas to a high velocity, and achieving high Mach numbers, without excessive decrease in temperature.

A further object is to provide novel gas-accelerating means involving plasma streams or jets.

A further object is to provide apparatus for employing a plasma stream to effect both acceleration and heating of gas.

Another object is to provide a wind tunnel which may employ air as the working medium, and which has little or no electrode deterioration and consequent gas contamination.

These and other objects and advantages of the invention will be more fully set forth in the following specification and claims, considered in connection with the attached drawings to which they relate.

In the drawings:

FIGURE 1 is a highly schematic view illustrating a first embodiment of the wind tunnel, constructed in accordance with the present invention;

FIGURE 2 is a less schematic, fragmentary longitudinal sectional view of the left end of the showing of FIGURE 1, and omitting illustration of the cooling means for the tunnel wall;

FIGURE 3 is a transverse section taken on line 3—3 of FIGURE 2, as viewed in the direction of the arrows; and FIGURE 4 illustrates a second embodiment of the wind tunnel, the showing of FIGURE 4 being adapted to be substituted for the portion of FIGURE 1 to the left of line Z—Z.

Referring first to the embodiment shown in FIGURES 1–3, and particularly to FIGURE 1, the wind tunnel is illustrated to comprise a generally oboloid test section 10 which merges at its downstream end with a divergent section, the latter having a supersonic portion 11 and a subsonic portion 12. The separation between portions 11 and 12 is generally indicated by the transonic line 13. Subsonic portion 12 communicates with the inlet of a vacuum or suction pump 14 having a discharge indicated at 15. The tunnel is cooled by means of cooling coils, or other suitable cooling means, indicated schematically at 16.

A plasma stream or jet torch 20 is mounted at the inlet end of test section 10, in such manner that the plasma jet 21 (FIGURE 2) flows into and axially of the inlet end of the test section. As will be described in detail subsequently, gas is introduced into the torch and is both accelerated and heated by the plasma jet. The torch 20 is constructed largely in accordance with the principles stated in the above-cited patent application, and also largely in accordance with our co-pending application Serial No. 747,094, filed July 7, 1958, for a Plasma Stream Apparatus and Methods, now Patent No. 2,922,869. It is to be understood, however, that the torch 20 may be of much larger size than specified (as examples) in said patent applications. There are certain differences, as will be stated hereinafter, between torch 20 and those described in the cited patent applications.

Proceeding next to a description of plasma jet torch 20, and with particular reference to FIGURES 2 and 3, the torch comprises a body 22, a plate electrode 23, a nozzle electrode 24 and an end disc 25. Body 22 comprises a cylinder 26 having an integral radial flange 27 at its right end, and is formed of a good electrical conductor such as copper. A cylindrical recess 28 is provided in the right end of body 22 in order to receive cooling water for the plate electrode 23, such water circulating through first and second passages 29 and 30 formed longitudinally of cylinder 26 and offset from the center thereof. A third passage 31 is formed axially in cylinder 26, being provided at its right end with a counterbore 33 which receives a stem or tube portion 34 formed axially of plate 23. Suitable O-rings 35 and 36 are provided, respectively, around stem 34 and radially outwardly of recess 28 in order to seal off the water in recess 28 as well as the gas in passage 31.

Plate or base (back) electrode 23 comprises a disc of copper, or other suitable conductor, having a central opening 37 which communicates through stem 34 with passage 31. An electrically-conductive refractory substance 38 is provided around opening 37 to retard deterioration thereof. At its right, outer portion the plate disc is annularly recessed to receive in flush relationship an insulating ring or gasket 39. Such ring projects farther outwardly than the disc, so that it may seat over the right edge of an additional insulating element 40 which fits closely around and conforms to the exterior surface of body 22 and also of plate 23.

Nozzle electrode 24 is also formed of a good electrical conductor such as copper, and comprises a solid annular portion 41 having a cylindrical skirt 42 which fits closely around the element 40. Formed integral with the right end of portion 41 is an inwardly extending nozzle wall or disc 43 which is made hollow to provide a water chamber 44. A short cylinder 46 is suitably brazed or otherwise secured around the wall 43 in order to close the water chamber 44.

The center of wall 43 is provided with a round nozzle opening or passage 47 which may be shaped, as illustrated, as a Laval nozzle. An electrically-conductive refractory substance 48 (such as tungsten) is provided on the wall of opening 47 to retard deterioration thereof. Opening 47 is normally larger than plate opening 37, and is substantially larger than the inlet opening for tangential gas flow as will be described hereinafter.

The previously-mentioned end disc 25 is suitably secured by means, not shown, adjacent the outer surface of wall or disc 43. End disc 25 is integral with, or suitably connected to, the narrow end portion 51 of the wall of test section 10. Such narrow end 51 acts as a continuation of the nozzle opening 47 to provide a nozzle action. An annular recess 52 is, however, provided in the interior surface of narrow end 51, adjacent the outer surface of plate wall 43, in order to provide a discontinuity in the interior nozzle surface for purposes to be described hereinafter. The nozzle or end portion 51 should preferably be formed of an insulator in order to conserve heat, but in many instances it is necessary to form the nozzle 51 of a heat-conductive metal in order to prevent it from burning up. Disc 25 may be made integral with nozzle 24.

In order to hold the elements in assembled condition, a retaining ring 53 is threaded into the skirt 42, so that it abuts against a radial wall of insulator 40 and causes flange 27 to be in close electrical contact with a surface of plate 23.

Current connection is made to the nozzle 24 by means of a threaded post 54 (FIGURE 3), which post is connected through a lead 55 to one terminal of a suitable source C (FIGURE 2) of current. A corresponding post, not shown, is provided on body 22 and is connected through a lead 55a to the other terminal of such current source.

Coolant water is passed through chamber 44 by means of inlet and outlet water hoses 57 and 58, respectively. Coolant water is passed through recess or chamber 28 by means of inlet and outlet water hoses 59 and 60, respectively, which communicate with passages 29 and 30. Gas may be introduced into the passage 31 and through plate opening 37 by means of an inlet hose 61.

An inlet passage 63 for gas is provided in nozzle portion 41, and in a plane which is perpendicular to the longitudinal axis of the apparatus. Such passage 63 is tangential to a cylindrical or annular chamber 64 which is defined by nozzle and the plate surfaces, such chamber being coaxial with the longitudinal axis of the apparatus and with the nozzle opening 47. Since passage 63 is tangential to cylindrical chamber 64, gas flowing through passage 63 enters chamber 64 and whirls in a vortical action. Passage 63 terminates in an inlet opening 66 which is preferably disposed closely adjacent the inner surface of nozzle wall 43. As will be described subsequently, gas may be introduced into passage 63 from a suitable gas pressure source G (FIGURE 3), through a hose 67. Alternatively, passage 63 may communicate with the ambient atmosphere, so that air is sucked into the chamber 64 by the action of the plasma jet 21.

*Methods and Theory Relative to the Embodiment Shown in FIGURES 1–3*

Let it be first assumed that the wind tunnel is to be operated with air as the only gas, in order to approximate closely the actual conditions occurring in the upper atmosphere. Coolant water is passed through the chambers 28 and 44 in order to cool the plate and nozzle electrodes, and a voltage is applied across the nozzle and plate by means of the lead 55 and also the unshown plate lead. Let is be assumed that the nozzle is supplied with negative direct voltage and the plate with positive direct voltage, although the opposite polarity may be employed as will be set forth hereinafter. In accordance with one mode of operation of the torch, gas is passed through the passage 63 only, and the plate opening 37 is blocked or sealed off. The tangential passage 63 is left open to the atmosphere, and the vacuum pump 14 is started in order to evacuate the wind tunnel.

The evacuation of the wind tunnel causes air to be sucked through passage 63 into cylindrical chamber 64 in a vortical action caused by the tangential relationship. A vortex or arc passage is thus formed at the axis of chamber 64 and nozzle opening 47, such vortex having a diameter determined by such factors as the degree of evacuation of the wind tunnel and the diameter of nozzle opening 47 at its narrowest (most constricted) point. An electric arc is then struck between the nozzle and plate, for example by momentarily impressing a high-frequency voltage thereacross. This arc is confined by the gas in chamber 64 to the vortex therein, and contacts the plate at refractory substance 38. The arc contacts the nozzle at the outer end of refractory substance 48, in the annular channel or discontinuity 52. Such passing of the arc through the opening 47 and into the discontinuity 52 results partly because of the fact that the gas (air) pressure in the channel 52 is lower than in the main portion of the nozzle, adjacent the plasma jet 21. This provides a reduced electrical insulation effect permitting striking of the arc at the outer end of refractory substance 48, as indicated at 68.

The gas in cylindrical chamber 64 passes through the nozzle opening 47 around the arc and also around the plasma jet 21 (FIGURE 2) which streams outwardly from opening 47 into the narrow end or nozzle portion 51 of the wind tunnel. The result is an action in which the air is not only heated by the plasma jet 21 and by the arc, but is also accelerated thereby due to the fact that the plasma jet has a very high velocity. As an example of the operation of the wind tunnel, let it be assumed that the flow velocity through the nozzle opening 47, effected by the plasma jet action and by the vacuum pump 14, is 10,000 feet per second. The temperature at the nozzle may be 15,000 degrees K., and the Mach number at the nozzle may be 1. Upon entering the test section, the gas expands greatly, increases in velocity and greatly decreases in temperature. Thus, the temperature in the test section (at line Z—Z) may be 300 degrees K., and the Mach number in the test section may be in the range of 6 to 10 or higher.

For continuous operation of the apparatus, pump 14 should have a high capacity, at least equal to the inflow of air through tangential passage 63. A typical pressure in the wind tunnel, during continuous operation, is $\frac{1}{10}$ or $\frac{1}{20}$ of an atmosphere. In order to achieve conditions simulating those at very high elevations above the ground, the entire wind tunnel should be evacuated for a long period of time, until the pressure is reduced to a low value, such as $10^{-6}$ millimeters of mercury. With such a procedure, data may be obtained in the short time period required for air flowing through the torch 20 to raise the pressure in the wind tunnel. Of course, during evacuation of the tunnel the inlet passages to chamber 64 are blocked off.

The maximum pressure in cylindrical chamber 64, adjacent the inlet opening 66, is higher than 1.6 times the pressure in the tunnel. It should be much higher, and may be as high as a million or more times the pressure in the tunnel, depending largely upon the degree of tunnel evacuation. The pressure in the chamber 64 should be sufficiently high to effect substantial constriction of the arc and the plasma jet 21, thereby increasing the temperature thereof as set forth in the above-cited co-pending patent applications. These pressures are absolute pressures.

The diameter of chamber 64 should be more than twice the diameter of opening 47 at its most constricted point (the throat of the Laval nozzle). The spacing between the adjacent surfaces of the nozzle and plate should be on the order of the diameter of the nozzle opening 47, and should not be more than four times such diameter, the diameter of the nozzle opening 47 being again taken at its most constricted point.

The current in the arc should be large in comparison to the voltage, since the torch is a relatively high-current, low-voltage type. The wind tunnel and torch may be made very large. For example, the diameter of the nozzle opening may be 3 or 4 inches, and the power input 5,000 kilowatts, at 1 or 2 thousand volts.

It is pointed out that the use of plasma torch 20 in the wind tunnel involves certain different considerations than the use of a plasma torch in cutting operations, for example, since certain different results are desired. In the normal, commercial use of a plasma jet torch, two primary factors are high heat and long nozzle electrode life. In the wind tunnel, however, the considerations of heat and nozzle electrode life may not be so important as purity of the jet, that is to say the absence of contamination of the jet by electrode material. Thus, in certain instances in the wind tunnel it may be desirable to cause the nozzle electrode to have a positive polarity and the plate electrode to have a negative polarity. The life of the nozzle electrode is thus reduced, and the heat of the plasma jet is greatly reduced, but the contamination of the plasma jet by electrode material may be less since the plate does not erode so rapidly when it is negative as when it is positive. Positive nozzle polarity may be advantageous when the diameter of the nozzle opening is relatively large, since the nozzle opening wall erodes less rapidly with increased nozzle opening sizes. Thus, when the nozzle opening is large the increased erosion thereof caused by positive nozzle polarity may be more than offset by the decreased plate erosion caused by negative plate polarity.

The passing of air into the chamber 64 reduces the life of the electrodes, since oxidation thereof takes place in a relatively short period of time. This defect, however, is normally offset by the fact that the gas passed through the torch is pure air and thus simulates actual atmospheric conditions. Furthermore, it has been discovered that the amount of deterioration of the electrodes (caused by air) is much less in a wind tunnel, for example, than in situations when a plasma torch (through which air is passed) is operated at atmospheric pressures exteriorly of the nozzle opening. This is because the amount of air actually passed through the torch may be less, while still maintaining the necessary ratio of the pressure in chamber 64 to the pressure outside of the nozzle opening, when the plasma jet is directed into a relatively evacuated chamber than when the jet is directed into the ambient atmosphere.

In certain instances, such as where long electrode life is desired, an oxidation-preventing gas (normally an inert gas such as argon or helium) is passed through the tangential inlet passage 63 in place of air.

In order to provide an approximation of atmospheric conditions while achieving a longer electrode life, an inert gas is employed as the whirling gas in chamber 64, and air is introduced through the hose 61 and passage 31 to the plate opening 37. Also, nitrogen may be introduced through the tangential passage 63 and oxygen through the plate opening 37, in the approximate proportions present in air. This provides a better approximation of actual air while achieving an increased degree of protection of the nozzle because of the layer of nitrogen adjacent the nozzle opening wall and around the plasma jet.

A representative model is indicated at M in FIGURE 1, the support therefor being indicated schematically at S.

*Embodiment of FIGURE 4*

The apparatus shown in FIGURE 4 is adapted to be substituted for the inlet portion of FIGURE 1, to the left of line Z—Z. The inlet tunnel portion 71 is illustrated as being a venturi having a throat 72. A plasma jet torch, which may be constructed in accordance with the showings of FIGURES 2 and 3, is provided with a teardrop casing 73 the pointed end of which is remote from the throat 72, and the relatively blunt end of which is disposed close to the throat but spaced radially inwardly from the tunnel wall in order to provide a gas or air passage around the casing 73. The plasma jet or stream is located generally in the throat 72 and axially thereof, and provides a suction effect tending to cause rushing of air or other gas around casing 73 and into the test section.

Other (or the same) gas may be introduced from a conduit 76 into a passage 77 and thus through the opening 78 in plate 79. The gas thus introduced is accelerated through the nozzle opening 80 by the plasma jet. This gas is additional to the whirling gas introduced through passage 63 shown in FIGURE 3.

According to one manner of operating the tunnel shown in FIGURE 4, nitrogen is introduced through passages 63 and 77, and oxygen (as distinguished from air) is introduced into the venturi throat around casing 73, from a suitable unshown source. The quantities of these gases are regulated so that the resulting mixture of oxygen and nitrogen in the test section is close to atmospheric air in its composition and effects. It is thus possible to approximate atmospheric air in the test section without passing oxygen through the plasma torch itself and thus accelerating the electrode deterioration therein.

Various embodiments of the present invention, in addition to what has been illustrated and described in detail, may be employed without departing from the scope of the accompanying claims.

We claim:

1. A wind tunnel apparatus, which comprises means to define a chamber having an inlet and outlet remote from each other, means connected to said outlet to draw at least a partial vacuum on said chamber, and plasma jet torch means disposed at said inlet to direct a plasma jet into said chamber, said torch means including spaced apart nozzle and back electrodes electrically insulated from each other, said nozzle electrode communicating on the side remote from said back electrode with a nozzle element leading into said chamber, means to provide a discontinuity in the nozzle wall between said nozzle electrode and nozzle element and on the side of said nozzle electrode relatively remote from said back electrode, means to impress a voltage on said nozzle electrode and on said back electrode to effect passage of an electric arc between said back electrode and said nozzle electrode in the region of said discontinuity, and means to introduce gas between said electrodes in quantity sufficient to constrict said arc and effect heating and acceleration of said gas through said nozzle electrode and said nozzle element.

2. The invention as claimed in claim 1, in which said discontinuity is an annular recess formed in said nozzle element adjacent the outer surface of said nozzle electrode.

3. A hyperthermal tunnel apparatus; which comprises an elongated pressure-resistant vessel having an elongated chamber therein; pump means communicating with one end portion of said chamber to draw gas therefrom and cause the pressure therein to be much less than atmospheric; and an electrical plasma-jet torch mounted at the other end portion of said chamber to inject plasma at high velocity into said chamber for impingement against a test object disposed therein, said plasma-jet torch comprising wall means having a passage therethrough communicating with said other end portion of said chamber, one end of said passage being nearer said one end portion of said chamber than is the other end of said passage, back electrode means having an arcing portion disposed more remote from said one end portion of said chamber than is said one end of said passage, front electrode means provided at the wall of said passage, at least a portion of said front electrode means being disposed substantially nearer said one end portion of said chamber than is said arcing portion of said back electrode means, means to insulate said front and back electrode means from each other, a source of electrical power connected between said front electrode means and said back electrode means to maintain a high-current electric arc therebetween, and means to prevent entrance of gas into said chamber except through predetermined gas-inlet means located adjacent said torch, at least a portion of said gas-inlet means including said passage, said front and back electrode means being so related to each other, to said power source and to the gas flow through said passage that said high-current electric arc is present in at least a portion of said passage, said gas being heated by said arc in said passage and being caused by said arc and by the subatmospheric pressure in said chamber to enter said chamber at high velocity in the form of plasma, said front electrode means being so shaped that said arc strikes thereto at a predetermined region which is much closer to said one end portion of said chamber than is said arcing portion of said back electrode means, said predetermined region being recessed away from the axis of said passage in comparison to adjacent portions of the wall of said passage, whereby a relatively low-pressure area is formed causing striking of said arc to said region.

4. A hyperthermal tunnel apparatus, comprising a pressure-resistant vessel having a test section adapted to contain a test object; pump means communicating with said vessel to remove gas from said vessel and cause the pressure in said vessel to be a small fraction of atmospheric; and plasma-injector means communicating with said vessel at said test section and remote from said pump means to inject plasma at high velocity into said test section for impingement against a test object disposed therein; said plasma-injector means including wall means to define a throat opening into said test section and having a diameter small in comparison to that of said vessel at said test section, a portion of said wall means on the opposite side of said throat from said test section defining an inlet region having a diameter larger than that of said throat, said wall means having an intake opening communicating with said inlet region and located on the opposite side of said throat from said test section, and an electrical plasma-torch disposed on the opposite side of said throat from said test section to discharge high-temperature high-velocity plasma into said inlet region independently of said intake opening, said plasma mixing with gas passed into said inlet region through said intake opening and flowing through said throat into said test section.

5. The invention as claimed in claim 4, in which said plasma-torch comprises a nozzle element having a nozzle passage communicating with said inlet region opposite said throat, a back electrode having an arcing portion disposed coaxially of said nozzle passage, said arcing portion being spaced farther from said throat than is at least a portion of said nozzle passage, said nozzle passage and said back electrode having walls spaced and insulated from each other and being surfaces of revolution about the axis of said nozzle passage, electrical conductor means provided at at least a portion of said nozzle passage which is substantially nearer said throat than is said arching portion of said back electrode, and means to maintain a high-current electric arc in at least a portion of said nozzle passage between said electrical conductor means and said arcing portion of said back electrode, said means including a current source and gas-injector means to effect rapid flow of gas through said nozzle passage into said inlet region.

6. The invention as claimed in claim 5, in which said gas-injector means includes means to effect vortical flow of said gas about the axis of said nozzle passage.

7. The invention as claimed in claim 5, in which said gas-injector means includes means to effect flow of sufficient gas through said nozzle passage to cause constriction of said arc to a smaller cross-sectional area than it would normally occupy in unconfined space whereby said arc and gas are heated to a temperature substantially higher than the temperature which said arc would have if it existed in unconfined space.

8. The invention as claimed in claim 4, in which said plasma-torch comprises a nozzle element having a nozzle passage communicating with said inlet region and extending coaxially of said throat, said nozzle passage being spaced from said throat on the opposite side thereof from said test section, a back electrode having an arcing portion disposed coaxially of said nozzle passage and spaced farther from said throat than is at least a portion of said nozzle passage, means to define a chamber communicating with said nozzle passage and disposed on the opposite side of said nozzle passage from said throat, said chamber having a diameter substantially larger than that of said nozzle passage and having a wall which is a surface of revolution about the axis of said nozzle passage, said back electrode having a wall portion disposed in said chamber, means to inject gas tangentially into said chamber for rapid vortical flow therein and subsequent flow through said nozzle passage into said inlet region, electrical conductor means provided at at least a portion of said nozzle passage which is substantially nearer said throat than is said arcing portion of said back electrode, and means to maintain a high-current electric arc in at least a portion of said nozzle passage between said electrical conductor means and said arcing portion of said back electrode.

9. The invention as claimed in claim 8, in which said electrical conductor means comprises at least a portion of the wall of said nozzle passage and is formed of metal, and in which means are provided to effect water-cooling of said electrical conductor means.

10. A hyperthermal tunnel apparatus, comprising a pressure-resistant vessel having a test portion adapted to contain a test object; pump means communicating with said vessel to remove gas from said vessel and cause the pressure in said vessel to be a small fraction of atmospheric; and plasma-injector means communicating with said vessel at said test portion to inject plasma at high velocity into said test portion for impingement against a test object disposed therein; said plasma-injector means including wall means to define a throat communicating with said test portion at a location spaced from said pump means, said throat having a diameter small in comparison to that of said vessel at said test portion, a part of said wall means on the opposite side of said throat from said test portion defining an inlet region having a diameter larger than that of said throat, and an electrical plasma-torch disposed on the opposite side of said throat from said test portion to discharge high-temperature high-velocity plasma into said inlet region, said plasma then flowing through said throat into said test portion.

11. A hyperthermal tunnel apparatus, comprising a pressure-resistant vessel having a test section adapted to contain a test object; pump means communicating with said vessel to remove gas from said vessel and cause the pressure in said vessel to be a small fraction of atmospheric; and plasma-injector means communicating with said vessel at said test section and remote from said pump means to inject plasma at high velocity into said test section for impingement against a test object disposed therein; said plasma-injector means including wall means to define a throat communicating with said test section and having a diameter small in comparison to that of said vessel at said test section, a portion of said wall means on the opposite side of said throat from said test section defining an inlet region having a diameter larger than that of said throat, and electrical plasma-torch means to discharge high-temperature high-velocity plasma into said inlet region, said plasma-torch means comprising wall means to define a relatively small-diameter nozzle passage one end of which communicates with said inlet region, means to maintain a high-current electric arc in at least a portion of said nozzle passage, and means to effect flow of gas through said nozzle passage into said inlet region, said gas being heated to a high temperature by said arc.

12. The invention as claimed in claim 11, in which said means to maintain said electric arc includes means to cause one end of said arc to pass through said one end of said nozzle passage to an electrode portion disposed adjacent said inlet region.

13. The invention as claimed in claim 11, in which said means to maintain said electric arc includes means to effect maintenance of said arc along the entire length of said nozzle passage.

References Cited in the file of this patent

UNITED STATES PATENTS

| | | |
|---|---|---|
| 2,768,279 | Rava | Oct. 23, 1956 |
| 2,770,708 | Briggs | Nov. 13, 1956 |
| 2,805,571 | Graham | Sept. 10, 1957 |
| 2,819,423 | Clark | Jan. 7, 1958 |
| 2,922,869 | Giannini et al. | Jan. 26, 1960 |
| 3,029,635 | Fetz | Apr. 17, 1962 |

OTHER REFERENCES

Publication: Early et al.: "Supersonic Wind at Low Pressures Produced by Arc in Magnetic Field," Physical Review, vol. 79, July 1, 1950, page 186, copy in Scientific Library.